United States Patent Office 3,393,137
Patented July 16, 1968

3,393,137
SOLVENT RECOVERY PROCESS
Warren L. Altman and William Hanzel, Lake Jackson, Tex., assignors to Nalco Chemical Company, Chicago, Ill., a corporation of Delaware
No Drawing. Continuation-in-part of application Ser. No. 351,021, Mar. 11, 1964. This application Dec. 14, 1965, Ser. No. 513,833
22 Claims. (Cl. 204—59)

ABSTRACT OF THE DISCLOSURE

Liquid hydrocarbons are used to extract glycol diethers from aqueous solutions, especially aqueous brine solutions, and particularly solutions obtained in the process of preparing water insoluble organo metallic compounds by electrolyzing a Grignard reagent in a glycol diether solvent in the presence of excess organic halide, using a sacrificial anode, separating any excess organic halide from the effluent, adding water to the residual effluent to form a water insoluble phase containing an organo metallic compound and an aqueous brine phase containing magnesium halide and said glycol diether, thereafter separating said phases and extracting the brine phase with a liquid aromatic hydrocarbon to remove glycol diether therefrom.

---

This application is a continuation-in-part of application Serial No. 351,021 filed March 11, 1964.

This invention relates to a solvent recovery process and more particularly to a process for recovering organic ethers from brines, i.e., aqueous salt solutions. The invention is especially concerned with the recovery of ether solvents from brines in the manufacture of organo metallic compounds by electrolyzing an organic ether solvent solution of a Grignard reagent, using a sacrificial anode.

The manufacture of organo metallic compounds, and more specifically organo lead compounds, by electrolyzing an anhydrous solution of a Grignard reagent in an organic solvent for the Grignard reagent is disclosed in U.S. Patents 3,007,857 and 3,007,858. In the process disclosed in U.S. 3,007,858 an excess of organic halide is added to the electrolyte. The term "Grignard reagent" refers to a complex organo magnesium compound which is commonly prepared by reacting magnesium with an organic halide. The term "organic halide" refers to organic chlorides, bromides and iodides. The halogen portion of the added organic halide does not have to be the same as the halogen portion of the Grignard reagent but in practice they are usually the same and the organic chlorides are most commonly employed because of their ready availability.

When lead is used as a sacrificial anode in an organic solvent solution of a Grignard reagent, organo lead compounds are formed. The cathode can be composed of any suitable conducting but non-reacting material, including, for example, ordinary steel, stainless steel, platinum, graphite, or the like. Ordinarily, the anode is composed of lead and the cathode of steel.

In carrying out a process of the type previously described, one type of organic solvent for the Grignard reagent which has been found to be especially suitable is an ether of an alkylene glycol. Very good results have been obtained by using a mixture of solvents, particularly a mixture of at least two co-solvents, one of which is tetrahydrofuran and the other a relatively high boiling ether. Tetrahydrofuran has the unusual property of increasing the conductivity of the Grignard solution. However, when used alone, the quantity which can be employed is limited by the tendency to form insoluble etherates which are solids and are likely to clog the electrolytic cell or to otherwise interfere with the recovery of the desired products. When tetrahydrofuran is employed in combination with a diether of an alkylene glycol, the tendency to form insoluble precipitates is largely inhibited without excessively reducing the conductivity or otherwise interfering with the operation of the process. In general, the diether of the glycol enhances the maintenance of a liquid phase.

Various diethers of glycols have been employed as solvents or co-solvents. Water immiscible diethers of glycols can be used, for example, the dibutylether of diethylene glycol, the hexylethylether of diethylene glycol, or the benzylethylether or triethylene glycol. Water miscible diethers of glycols can likewise be used, for example, the diethylether of diethylene glycol, the diethylether of triethylene glycol, the diethylether of tetraethylene glycol or the diethylether of pentaethylene glycol. These diethers of glycols, whether water miscible or water immiscible, are relatively costly materials and hence when they are used as solvents or co-solvents, it is desirable to recover them and reuse them in the process. Recovery presents some problems because in order to be suitable for use in the process, the solvent should be anhydrous and otherwise uncontaminated with substances that might react with a Grignard reagent.

One way of carrying out an electrolytic process of the type described is to electrolyze the electrolyte until the Grignard reagent is almost exhausted. The effluent from the electrolytic cell is then treated to recover the organo metallic compound which is water insoluble. Another possibility is to partially electrolyze the electrolyte, recover the organometallic compounds and recycle the electrolyte. In either case, an important part of the recovery system, where a diether of a glycol is used as a solvent, is the recovery of such diether.

In one type of recovery system the effluent from the cell is subjected to steam distillation in order to remove a lower boiling organo metallic compound, such as, for example, tetramethyl lead. The steam distillation introduces water into the residue thereby forming a brine which also contains undistilled glycol diether. In another type of process wherein the diether of a glycol is water miscible, the effluent is mixed with water to produce a water miscible phase and a water immiscible phase, the water immiscible phase containing the organo metallic compound, and the water miscible phase being a brine containing the diether of the glycol. In both types of recovery operations it is desirable to remove any unreacted organic halide before adding water to the effluent.

One of the objects of the present invention is to provide new and improved processes for recovering diethers of glycols from brines and especially from brines which are obtained in the manufacture of organo metallic compounds, e.g., organo lead compounds, as previously described.

An additional object of the invention is to provide a new and improved recovery system for recovering the co-solvents, one of which is a diether of a glycol, and the other tetrahydrofuran, from the cell effluent (spent electrolyte) obtained by the electrolysis of a Grignard reagent dissolved in such co-solvents, using a sacrificial anode.

A more specific object is the recovery of diethers of glycols in systems of the type described wherein a diether of a glycol is employed which has the property of diminishing solubility in water upon heating.

A further object of the invention is to provide a new and improved extraction process for recovering diethers of glycols from brines and especially from brines obtained in the preparation of organo metallic compounds as previously described. Other objects will appear hereinafter.

In accordance with the invention it has been found that diethers of glycols can be extracted from brines containing them by extracting such brines with liquid hydrocarbons, preferably liquid hydrocarbons boiling within the range of 80° C. to 180° C. Especially good results have been obtained by using as the extractant benzene or toluene. In general, liquid aromatic hydrocarbons are preferred for the practice of the invention.

In practicing the invention it has also been found that more effective recovery of diethers of glycols from brines is obtained by acidifying the brines before extracting them.

It has also been found that improved results are obtained by heating the brines preferably to a temperature of at least 150° F. A preferred range of temperatures is 180–210° F. Higher temperatures can be used under superatmospheric pressures. The net result is a more effective extraction by the liquid hydrocarbon which is employed as an extractant for brines containing such diethers of glycols.

Inasmuch as benzene boils at 80° C. under atmospheric pressure conditions and it is desirable to carry out the extraction under conditions wherein the extractant does not boil, the temperature of extraction, when using benzene, should be below 80° C. (176° F.) or else superatmospheric conditions should be employed. Since toluene boils at 110° C. (230° F.) it is usually better to employ toluene as an extractant when operating in the preferred temperature range of 180–210° F. because then the extraction can be carried out at atmospheric pressure.

glycol. Moreover, from a practical standpoint to avoid corrosion of the extraction tower it is usually desirable to operate at a pH of 5–7.

In general, it is preferable to carry out the extraction until the concentration of diether of the glycol remaining in the brine is less than 50 parts per million.

The diether of the glycol is recovered or separated from the liquid hydrocarbon by fractional distillation or in any other suitable manner. If the diether of the glycol is water miscible, the recovery can be effected by a subsequent water extraction.

When tetrahydrofuran (boiling point 64–66° C.) is employed as a co-solvent with a higher boiling ether (boiling point usually above 150° C.) it is desirable to separate as much as possible of the tetrahydrofuran prior to the extraction of the brine with a liquid hydrocarbon solvent.

The invention will be further illustrated but is not limited by the following examples in which the quantities are given by weight unless otherwise indicated.

EXAMPLE I

In this example, tetrahydrofuran is referred to as "THF" and the diethylether of tetraethylene glycol is referred to as "DETEG."

A series of batchwise extractions of DETEG from a magnesium chloride brine were carried out. Samples of the extracted brine were analyzed and the analytical results are given in Table I. The magnesium chloride concentration, the THF concentration, the DETEG concentration, the temperature, the pH and the brine-solvent ratio were all varied.

TABLE I

| Run No. | 1 | 2 | 3 | 4 | 5 | 6 | 7 | 8 |
|---|---|---|---|---|---|---|---|---|
| Brine Comp. $MgCl_2$, wt. percent | 4 | 10 | 4 | 10 | 10 | 10 | 10 | 10 |
| THF, wt. percent | 15 | 15 | 15 | 15 | 15 | 0 | 0 | 0 |
| DETEG, wt. percent | 8 | 8 | 8 | 8 | 8 | 8 | 8 | 8 |
| pH | 3.5 | 3.5 | 3.5 | 3.5 | 1.7 | 3.5 | 3.5 | 3.5 |
| Toluene:Brine | 1:1 | 1:1 | 1:1 | 1:1 | 1:1 | 1:1 | 1:5 | |
| Benzene:Brine | | | | | | | | 1:5 |
| Tem., °F | [1] 77 | 150 | 150 | 180 | 180 | 180 | 180 | 150 |
| DETEG content (p.p.m.) of aqueous phase after extraction (No.): | | | | | | | | |
| 0 | | 19,000 | 51,000 | 20,000 | 11,000 | 46,000 | | |
| 1 | | 190 | 270 | 164 | 53 | 150 | 150 | 400 |
| 2 | | 20 | 190 | 11 | | 16 | 120 | 330 |
| 3 | | 10 | 17 | 2 | 2 | 2 | 46 | 55 |
| 4 | | 7 | 3 | 2 | | 2 | 22 | 15 |
| 5 | | 8 | 3 | 2 | | 2 | 11 | 10 |
| 6 | | | | | | | | |
| 7 | 33 | | | | | | | |
| 8 | 16 | | | | | | | |
| 9 | 9 | | | | | | | |

[1] Rm.

The amount of extractant employed is subject to variation but the ratio of extractant to brine is usually within the range of 2:1 to 1:10, either on a weight basis or on a volume basis. For example, in using toluene as the extractant, a good weight ratio of extractant to brine is about 1:5 on a weight basis or 1:4 on a volume basis.

In commercial practice the extraction is carried out in a series of successive extractions, the number of extractions being such as to obtain the optimum efficiency. A series of five successive extractions has been found to be quite effective. In each extraction the brine and the extractant are intimately mixed by means of an agitator or other suitable stirring device. Where successive extractions are used, it is preferable to have the ratio of extractant to brine less than 1:1. On the other hand, where only a single extraction is employed, the extraction efficiency is better at an extractant to brine weight ratio of 1:1 or higher.

The extraction efficiency is increased with higher dissolved solids content of the brine.

The extraction efficiency is also enhanced by acidifying the brine. A pH of 2 to 6 is preferred. Care should be taken, however, that the acidification is not so great as to cause significant decomposition of the diether of the glycol.

Comparing Run No. 1 with Run No. 3 it will be seen that the extraction efficiency increased with higher temperature. Likewise, in Run No. 4 where the temperature was 180° F. the extraction efficiency was better than in Run No. 2 where the temperature was 150° F.

Comparing Run No. 2 with Run No. 3 it will be seen that the extraction efficiency increased with a higher magnesium chloride concentration in the brine.

Comparing Run No. 4 with Run No. 5 it will be seen that the extraction efficiency was enhanced by a lower pH.

Comparing Run No. 6 with Run No. 7 it will be seen that the extraction efficiency was higher at a 1:1 brine-solvent ratio than at a 5:1 brine-solvent ratio.

Comparing Run No. 7 with Run No. 8 it will be seen that toluene and benzene are approximately equally effective as extraction solvents.

EXAMPLE II

This example illustrates the effect of THF in toluene on the extraction of DETEG from a magnesium chloride brine. The brine employed consisted of 100 cc. of 5% magnesium chloride dissolved in water (95% water), plus 5 grams of DETEG (50,000 p.p.m.), plus one gram of THF (10,000 p.p.m.).

The resultant solution was extracted with 10 cc. portions of toluene at 185° F. in 5 successive extractions.

The extractant consisted of toluene with no THF added, toluene with 300 p.p.m. THF added, and toluene with 1000 p.p.m. THF added.

The results obtained are given in the following table.

TABLE II

| Extraction No. | Parts per Million THF in Toluene | | | | | |
|---|---|---|---|---|---|---|
| | 0 p.p.m. THF | | 300 p.p.m. THF | | 1,000 p.p.m. THF | |
| | DETREG, p.p.m. in Brine | THF, p.p.m. in Brine | DETEG. p.p.m. in Brine | THF, p.p.m. in Brine | DETEG, p.p.m. in Brine | THF, p.p.m. in Brine |
| 1 | 4,000 | 7,000 | 3,800 | 6,000 | 4,550 | 7,200 |
| 2 | 1,100 | 3,600 | 1,040 | 3,300 | 970 | 2,900 |
| 3 | 800 | 1,166 | 1,020 | 2,100 | | 2,666 |
| 4 | 38 | | 89 | 615 | 117 | 800 |
| 5 | 60 | 400 | 51 | 350 | 20 | 300 |

From these results it will be seen that the toluene was more effective in removing the DETEG than in extracting the THF from the brine and the final brine after five successive extractions contained 20 to 60 p.p.m. of DETEG and 300 to 400 p.p.m. of tetrahydrofuran. This leads to the conclusion that in extracting DETEG from a brine with toluene it is preferable to first remove THF if THF was originally present in the brine.

EXAMPLE III

A Grignard solution was electrolyzed in an electrolytic cell of the type described in U.S. 3,141,841 using an excess organic halide. In this case the product manufactured was tetraethyl lead. The input of lead was 1490 parts, magnesium 393 parts, and ethyl chloride 2364 parts. Prior to electrolysis, the magnesium and the ethyl chloride were reacted in co-solvents consisting of THF and DETEG to give a solution of ethyl magnesium chloride containing a slight excess of ethyl chloride.

The electrolysis was carried out at a temperature of 120° F. and an average current density of 23 amperes per square foot until a very small amount (0.06 millimole per gram of solution) of ethyl magnesium chloride remained.

The effluent from the electrolytic cell comprised 268 parts ethyl chloride, 5465 parts THF, 2300 parts tetraethyl lead, 2345 parts DETEG and 1540 parts magnesium chloride. By passing the effluent through a stripping tower 248 parts of ethyl chloride and 2000 parts of THF were removed.

The remainder of the effluent was then mixed with 18,900 parts of water, acidified to a pH of 1.2 with hydrochloric acid. The water used was recycled from another stage of the process and contained 1 part of THF, 320 parts of DETEG and 1 part of toluene. The addition of the water caused the formation of two separate layers, the lower layer contained practically all of the tetraethyl lead. The upper layer contained 2665 parts THF, 18,900 parts water, 2345 parts DETEG and 1540 parts magnesium chloride. The two layers were separated by decantation or in any other suitable manner and the tetraethyl lead was recovered from the lower layer. The present invention is concerned with the treatment of the upper layer in order to recover the DETEG and the THF.

The upper layer was then neutralized by the addition of sodium carbonate (Na₂CO₃) and subjected to treatment with steam in a stripping tower whereby practically all of the THF (2663 parts) was removed through the top of the tower, together with 1142 parts of water. The residual brine in the tower contained 2 parts THF, 21,358 parts of water, 2,345 parts of DETEG and 1540 parts of MgCl₂. This brine was then subjected to extraction by passing it through a 5-stage extraction tower, each stage being equipped with an agitator. In this tower 6000 parts of toluene were added and the toluene extract was removed from the top of the tower. This extract contained 6000 parts of toluene and 2345 parts of DETEG with about 1 part of THF. The residual brine contained 21,358 parts of water and 1540 parts of MgCl₂ with a trace of THF.

The toluene and DETEG were separated from each other by steam distillation, the toluene being distilled and separated and the residue being DETEG containing some water. The DETEG was then heated to remove the water.

The toluene was also heated to remove water and both recycled for use in the process.

EXAMPLE IV

The procedure was similar to that described in Example III except that the product was tetramethyl lead. The methyl magnesium chloride used as the Grignard reagent was made by reacting 393 parts of magnesium with 1763 parts of methyl chloride. In a co-solvent consisting of THF and DETEG to give a solution of methyl magnesium chloride containing a slight excess of methyl chloride. 214 parts of toluene were added to the electrolyte. 1490 parts of lead was used as the sacrificial anode.

The electrolysis was carried out at a temperature of 121° F. and an average current density of 22.5 amperes per square foot until a very small amount (0.06 millimole per gram of solution) of methyl magnesium chloride remained.

The effluent from the electrolytic cell comprised 210 parts methyl chloride, 5625 parts THF, 1930 parts tetramethyl lead, 214 parts toluene, 2415 parts DETEG and 1540 parts magnesium chloride. By passing the effluent through a stripping tower, 200 parts of methyl chloride, 845 parts of THF, 30 parts of tetramethyl lead and 3 parts of toluene were removed. Of the portion removed, 73 parts of methyl chloride, 527 parts THF, 30 parts of tetramethyl lead and 3 parts of toluene were recycled for use in making up the electrolyte. Also, 127 parts of methyl chloride, and 318 parts of THF were mixed with 2415 parts of DETEG and recycled to make more electrolyte.

The remainder of the effluent was mixed with an aqueous solution consisting of 25,050 parts water, acidified with hydrochloric acid to a pH of 4, together with 300 parts DETEG and 1 part toluene derived from a previous recovery cycle. The addition of the water caused the formation of two separate layers, the lower layer containing practically all of the tetramethyl lead. The upper layer contained 3870 parts THF, 25,050 parts water, 2415 parts DETEG and 1540 parts magnesium chloride. The two layers were separated by decantation and the tetramethyl lead was recovered from the lower layer.

The upper layer was then neutralized by the addition of sodium carbonate and steam stripped to remove practically all of the THF (3868 parts), together with 1660 parts of water.

The residual brine containing 2 parts THF, 28,210 parts water, 2415 parts DETEG and 1540 parts magnesium chloride was then subjected to extraction by passing it through a five-stage extraction tower, each stage being equipped with an agitator. In this tower 7000 parts of toluene were added and the toluene extract which was removed contained 7000 parts of toluene, 2415 parts of DETEG and 1 part of THF. The residual brine solution consisting of 1540 parts of magnesium chloride in 28,210 parts of water was discarded.

The toluene and DETEG were separated from each other by steam distillation, the DETEG was dried and both the toluene and the DETEG were recycled for use in the process.

EXAMPLE V

A series of tests was run in which 10 volumes of 5% brine (5% MgCl₂ in water) containing varying amounts of THF and DETEG were extracted with 1 volume of toluene at 180° F. The results are shown in the following table.

TABLE III

| Solution to be Extracted 100 ml. 5% brine containing (grams) | | Amounts (p.p.m.) of DETEG and THF found in extracted brine (p.p.m.) | |
|---|---|---|---|
| A (DETEG) | B (THF) | DETEG | THF |
| 10.0 | 1.0 | 20,000 | 5,100 |
| 7.5 | 0.75 | 10,970 | 4,150 |
| 5.0 | 0.50 | 10,000 | 2,100 |
| 2.5 | 0.25 | 7,023 | 1,875 |
| 1.0 | 0.10 | 450 | 1,000 |
| 0.1 | 0.08 | 150 | 385 |
| 0.04 | 0.06 | 86 | 300 |
| 0.025 | 0.05 | 59 | 260 |
| 0.010 | 0.04 | 50 | -------- |
| 0.007 | 0.03 | 30 | 157 |
| 0.004 | 0.02 | 25 | 25 |
| 0.002 | 0.015 | 25 | 25 |
| 0.001 | 0.01 | 25 | -------- |

EXAMPLE VI

The electrolyte was methyl magnesium chloride dissolved in co-solvents consisting of 35% THF and 65% hexylethylether of diethylene glycol (HEC). The solution contained 1.67 millimoles of Grignard reagent per gram of solution. In addition, a quantity of toluene was added equivalent to 20% by weight of the calculated amount of tetramethyl lead. Excess methyl chloride in the amount of 0.3 mole per mole of Grignard reagent was also added to the electrolyte.

The electrolysis was carried out in a cell of the type described in U.S. 3,141,841 at a temperature of 118° F. and a current density of 28 amperes per square foot. When the methyl magnesium chloride content had been reduced to 0.06 millimole per gram of solution, the electrolysis was discontinued and the effluent from the cell was passed through a stripping tower to remove excess methyl chloride and other gases.

The cell liquor from which gases had been removed was then steam distilled thereby removing THF, tetramethyl lead and toluene by distillation. The residue was composed to HEC and a brine layer containing mainly water, dissolved magnesium chloride and a fraction of 1% of HEC. The present invention is concerned with the treatment of this brine layer.

The brine layer was acidified with a dilute aqueous solution of hydrochloric acid sufficient to produce a pH of 3 to 4. The acidified brine was scrubbed with toluene using 0.2 part of toluene per part of brine. In this way, the toluene extracted the HEC and the resultant extract was recycled for further use in the process. If desired, the extract can be neutralized by washing with a dilute (0.1% by weight) caustic soda solution.

EXAMPLE VII

An electrolyte was prepared by reacting methyl chloride with magnesium in approximately equimolar proportions in a completely water miscible solvent consisting of 50% THF and 50% DETEG. The concentration of the —OH was 1.44 millimoles per gram initially. Excess methyl chloride was added in an amount equal to 0.15 mole per mole of methyl magnesium chloride. Toluene was also added in an amount corresponding to 2.5% by weight of the total THF and DETEG.

The electrolyte was electrolyzed at a temperature of 110° F. and an average voltage of 25.6 volts for a total of 255 ampere hours. The average current density was 14.8 amperes per square foot. The spent electrolyte contained 0.08 millimole per gram of methyl magnesium chloride.

The effluent from the cell consisting of methyl chloride, THF, tetramethyl lead, toluene, DETEG and magnesium chloride, was mixed with water, acidified with hydrochloric acid to a pH of 3, thereby forming two layers, one being a brine layer containing water miscible constituents and the other containing the tetramethyl lead, together with toluene, some THF and DETEG.

The amount of water used was sufficient to give a brine phase containing about 27% MgCl₂. This high a salt concentration caused a large part of the DETEG to be salted out into the other layer. Additional water was added to the brine layer which was then heated to a temperature of about 203° F. Since DETEG has diminishing water solubility on heating, the resultant brine was passed to a phase separator tank where the brine immiscible layer was separated. The remaining brine phase containing THF and DETEG was then extracted with toluene. At this point the brine phase contained 500 parts THF, 340 parts DETEG, 3560 parts MgCl₂ and 12,859 parts water. The extractant consisted of 450 parts toluene. The extraction removed the DETEG, and the THF, leaving a solution of magnesium chloride in water.

The solution of DETEG and THF in toluene was then recycled for use in the process after treatment to separate the various components.

While the foregoing examples illustrate the invention particularly with respect to the extraction of DETEG and THF, or DETEG alone, from an aqueous magnesium chloride solution in water, it will be understood that the invention is also applicable to the extraction of other organic solvents and co-solvents of a similar type including the water immiscible glycol diethers and the water miscible glycol diethers previously mentioned. These glycol diethers can be defined by the general formula $$R_1(OC_nH_{2n})_xOR_2$$

where $R_1$ and $R_2$ are the same or different hydrocarbon radicals each preferably containing at least two carbon atoms, $n$ is 2 to 6, and $x$ is an integer, preferably 2 to 6. The oxyalkylene radicals represented by $(OC_nH_{2n})$ can be and preferably are all oxyethylene radicals but they can also be, for example, all oxy-1,2-propylene, or all oxy-1,2-butylene, oxyamylene, or oxyhexylene, or mixtures either in random or sequential succession, such as, for example, $-OC_2H_4 \cdot OC_3H_6-$, or $$-OC_2H_4 \cdot OC_3H_6 \cdot OC_2H_4-$$

or $-OC_2H_4 \cdot OC_2H_4 \cdot OC_3H_6 \cdot OC_2H_4 \cdot OC_2H_4-$, or $$-OC_2H_4 \cdot OC_3H_6 \cdot OC_3H_6 \cdot OC_3H_6 \cdot OC_2H_4-$$

or $-OC_2H_4 \cdot OC_4H_8 \cdot OC_2H_4-$. Preferred diethers are those in which $R_1$ and $R_2$ are hydrocarbon radicals containing 2 to 7 carbon atoms, $n$ is 2 and $x$ is 3 to 6.

In general, the hydrocarbon radicals (including the alkylene radicals) in the formula should be of such configuration and chain length, either straight or branched, that the solvent is normally liquid under the electrolytic conditions and preferably normally liquid at 20° C.

To illustrate the glycol diethers more specifically, in the formula $n$ can be 2 or 3 or both 2 and 3, $x$ can be 3 or 4 and $R_1$ and $R_2$ can both be methyl, or both ethyl, or both propyl, or both butyl, or both amyl, or both hexyl, or both phenyl, or one can be ethyl and the other phenyl, or one can be ethyl and the other benzyl, or one can be ethyl and the other hexyl. Some of these diethers are water miscible and others are water immiscible, depending upon the number of oxyethylene groups present, and the chain length of the hydrocarbon groups. In general, water solubility is increased by the addition of oxyethylene groups. These products can be made by adding alkylene oxides, such as, for example, ethylene oxide or 1,2-propylene oxide to glycol monoethers until the desired number of oxyalkylene groups has been added. The terminal hydroxyl group is then etherified. The glycol diethers can be single compounds or mixtures.

The term "Grignard reagent" as used herein refers to the product obtained by reacting approximately equimolar proportions of a compound having the formula RX and Mg according to the equation:

$$RX + Mg \rightarrow RMgX$$

in which R represents the organic radical, X represents the halogen atom of the Grignard reagent, and Mg is the conventional symbol for magnesium. The radical R can be, for example, methyl, ethyl, propyl, isopropyl, butyl and higher homologues, phenyl, benzyl, and the like. The radical X can be, for example, chlorine, bromine or iodine.

While the invention has been illustrated with the preparation of organic lead compounds, it will be apparent that the metal of the anode can be another metal capable of dissolving when used as an anode in an anhydrous organic solvent solution of a Grignard reagent. Examples of such other metals are aluminum, calcium, zinc, cadmium, manganese, mercury, lanthanum, thallium, arsenic, bismuth, tellurium and selenium.

The aqueous solutions from which the glycol diethers are recovered with or without lower boiling ethers, such as, THF, have been described with reference to magnesium chloride solutions but the invention is equally applicable to the recovery of the glycol ethers from other brines, such as, sodium chloride brines, potassium chloride brines, calcium chloride brines and from water. The invention is especially important in recovering water miscible glycol diethers from water or brines of the type previously mentioned and particularly in the recovery of glycol diethers which are not only water miscible but have a diminishing solubility in water when heated.

In practicing the invention it has been noted that some of the glycol diethers, such as, for example, the diethylether of tetraethylene glycol, contain minor amounts of impurities of unknown types which are either produced during the formation of the ethers or formed therein as decomposition products when these ethers are employed as solvents in an electrolytic process of the type previously described. These components are undesirable for reuse in the process. It has been found that they are not extracted by the toluene and therefore remain in the brine solution which is a definite advantage.

It will be understood that the range of dissolved solids present in the brine is subject to variation but is usually within the range of 1% to 28% by weight. In an electrolytic process of the type described, this will depend upon, of course, the amount of water added to the cell effluent in the recovery system. It is usually preferable to have a brine concentration within the range of 5% to 20% dissolved solids.

In reducing the pH of the cell effluent, hydrochloric acid is preferred but other acids can be employed, as, for example, sulfuric acid.

In neutralizing the acidified brine any alkali can be employed, such as, for example, ammonia, sodium hydroxide, potassium hydroxide or sodium carbonate. However, a dilute solution of sodium hydroxide is preferred because it is less costly.

While toluene and benzene are the preferred extractants other liquid hydrocarbons can be used, including aliphatic hydrocarbons, such as, for example, hexane, heptane, octane, xylenes, cyclohexane, methylcyclohexane, ethylbenzene, etc.

The invention solves an important problem in the recovery of costly ethers from aqueous solutions. Where these ethers are only slightly soluble, such as the hexylethylether of diethylene glycol, it might be thought that the recovery of less than 1% ether would be of no consequence but in a large scale operation where the solvent is being recycled, this is an important factor in the economy of the process. It is also an important factor in preventing pollution of the brines with organic solvents where the brines are discarded and not attempt is made to recover the dissolved salts therefrom. The invention is even more important in the recovery of water miscible solvents because of the larger proportions which are present in the water when water is used as an extractant in these recovery processes.

The invention is hereby claimed as follows:

1. A process for extracting a glycol diether from an aqueous solution thereof which comprises extracting said solution with a liquid hydrocarbon.

2. A process as claimed in claim 1 in which said solution is a brine solution.

3. A process as claimed in claim 1 in which said solution is a magnesium chloride solution having a concentration of magnesium chloride within the range of 1% to 28% by weight.

4. A process as claimed in claim 1 in which said solution has a pH within the range of 2 to 6.

5. A process as claimed in claim 1 in which said solution is heated to a temperature of at least 150° F.

6. A process as claimed in claim 1 in which the ratio of extractant to solution is within the range of 2:1 to 1:10.

7. A process as claimed in claim 1 in which said solution is heated to a temperature of 180° F. to 210° F.

8. A process as claimed in claim 1 in which said glycol diether is water miscible and has the property of diminishing solubility in water when heated.

9. A process as claimed in claim 1 in which said glycol diether is the diethylether of tetraethylene glycol.

10. A process as claimed in claim 1 in which said glycol diether is the hexylethylether of diethylene glycol.

11. A process as claimed in claim 1 in which said solution also contains tetrahydrofuran.

12. A process as claimed in claim 1 in which said solution also contains tetrahydrofuran and said tetrahydrofuran is removed by steam stripping before extraction.

13. A process as claimed in claim 1 in which said extractant is toluene.

14. A process as claimed in claim 1 in which said extractant is benzene.

15. In a process of preparing water insoluble organo metallic compounds by electrolyzing a Grignard reagent in a glycol diether solvent in the presence of excess organic halide, using a sacrificial anode, separating any excess organic halide from the effluent, adding water to the residual effluent to form a water insoluble phase containing said organo metallic compound and an aqueous brine phase containing magnesium halide and said glycol diether and separating said phases, the step which comprises extracting said brine phase with a liquid hydrocarbon to extract said glycol diether therefrom.

16. A process as claimed in claim 15 in which tetrahydrofuran is a co-solvent with said glycol diether for said Grignard reagent and said tetrahydrofuran is separated from said brine before said extraction.

17. A process as claimed in claim 15 in which the pH of said brine is adjusted to a pH of 2 to 6 before extraction.

18. A process as claimed in claim 15 in which said brine is heated to 180° F. to 210° F. before extraction.

19. A process as claimed in claim 15 in which the resultant extract is steam stripped to separate the liquid hydrocarbon from the glycol diether.

20. A process as claimed in claim 15 in which the liquid hydrocarbon is a liquid aromatic hydrocarbon.

21. A process as claimed in claim 15 in which the Grignard reagent is methyl magnesium chloride, the organic halide is methyl chloride, the solvent for the Grignard reagent is a mixture of tetrahydrofuran and the diethylether of tetraethylene glycol, the tetrahydrofuran is separated from the brine before extraction and the brine is extracted with toluene successively, the weight ratio of extractant to brine being within the range of 2:1 to 1:10.

22. A process as claimed in claim 15 in which the Grignard reagent is ethyl magnesium chloride, the organic halide is ethyl chloride, the solvent for the Grignard reagent is a mixture of tetrahydrofuran and the diethylether of tetraethylene glycol, the tetrahydrofuran is separated from the brine before extraction and the brine is extracted with toluene successively, the weight ratio of extractant to brine being within the range of 2:1 to 1:10.

References Cited

UNITED STATES PATENTS 3,067,260  12/1962  Nobis et al. _____ 260—705 X
3,164,537  1/1965  Linsk et al. _____ 204—59

HOWARD S. WILLIAMS, *Primary Examiner.*